Patented Dec. 7, 1926.

1,609,310

UNITED STATES PATENT OFFICE.

JAMES A. RODGERS, OF ST. LOUIS, MISSOURI, ASSIGNOR TO THE EMERSON ELECTRIC MFG. CO., OF ST. LOUIS, MISSOURI, A CORPORATION OF MISSOURI.

MOTOR.

Application filed March 23, 1925. Serial No. 17,459.

This invention relates to improvements in motors.

An object of the invention is to provide a motor arranged to operate at different speeds with provision for starting the motor to develop any one of the speeds, the control of the motor being at a common switch point.

More particularly an object of the invention is to provide a motor equipped with field windings constituting main circuits of different number of poles, and complementary starting or phase windings of a number of poles corresponding with the main windings respectively, said phase windings being in series and adapted to be placed in circuit selectively with the main windings, whereby the circuits may be controlled to start the motor with any main winding in circuit.

Figure 1:
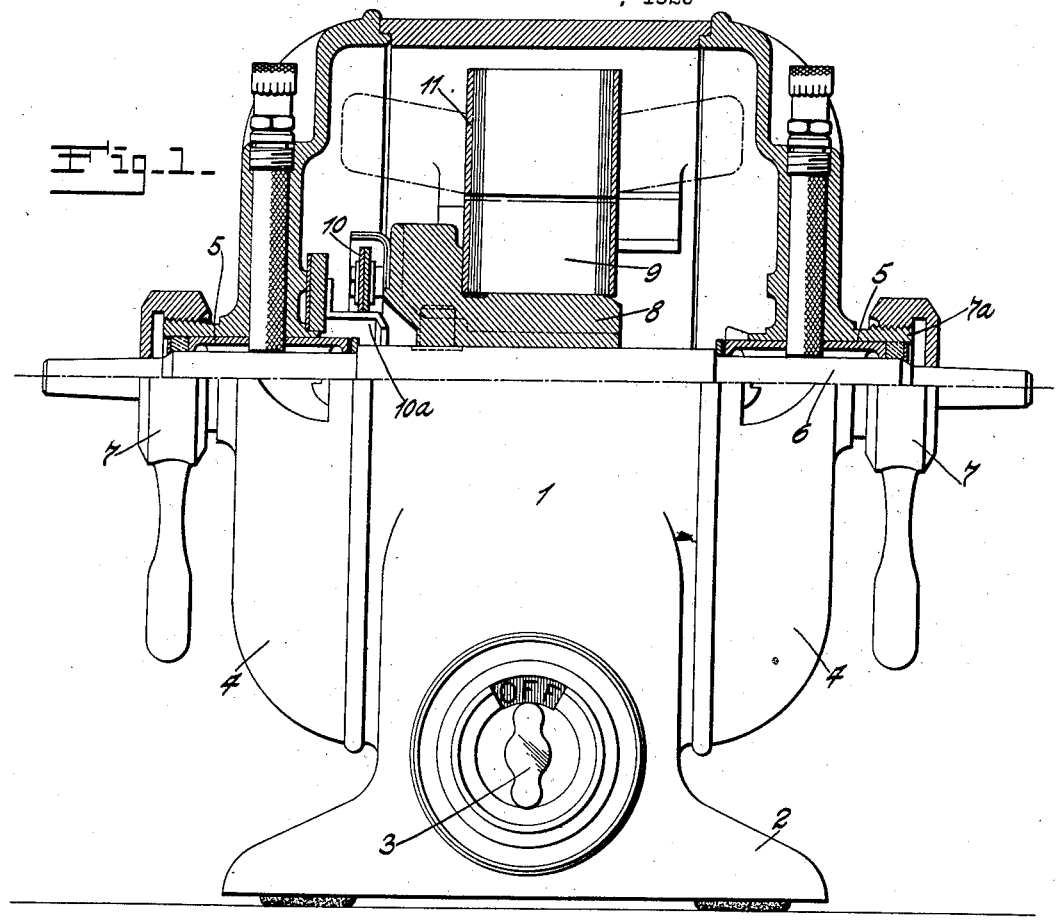

The specific improvements in the design and arrangement of circuits to accomplish broadly the above mentioned objects will be fully understood from the following detailed description of an embodiment of the invention illustrated in the accompanying drawing, in which Fig. 1 is a view of the motor partially in section.

Figure 2:
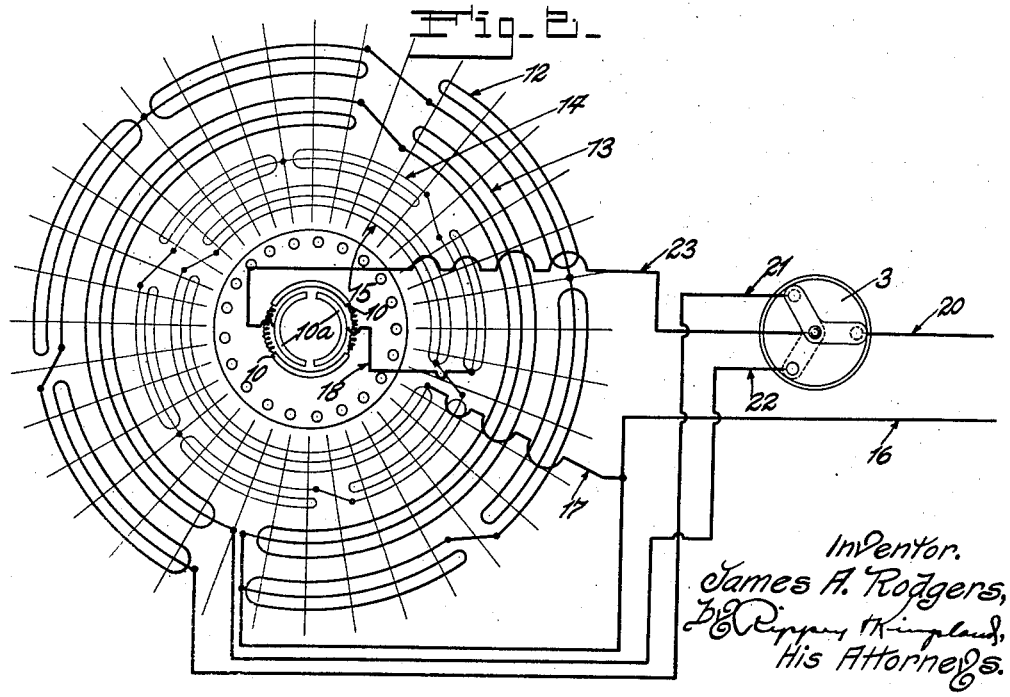

Fig. 2 is a diagrammatic view showing the circuit arrangement of the motor with the controls therefor.

As illustrated in the drawing the invention is shown as embodied in a motor designed for a two-speed lathe. In this embodiment there is included a motor frame 1 supported by a base 2 in which there is a controlling switch 3. The frame 1 carries end plates 4 in which there are bearings 5 for supporting the armature shaft 6. The armature shaft projects at either end of the motor for supporting chucks, and chuck removers 7 are threaded on the hubs 7ª formed on the end plates. The armature shaft 6 carries centrally of the frame of the motor an armature core 8 upon which an armature 9 of the squirrel cage induction type is carried. An automatic cutout of known construction is provided to automatically cut out the phase windings when the armature has attained a predetermined speed. This cutout includes contact plates 10 supported for radial movement on a hub attached to the armature, which plates operate upon segments 10ª carried by the end plate. As the construction and operation of the cutout are known it is unnecessary to describe it in further detail. The field windings both of the main and phase circuits are wound upon a laminated toothed field core 11 supported in the motor frame around the armature.

While a preferred form of embodiment of the invention is shown in the structure just described, it will be understood that it is merely an illustrative embodiment, as the invention consists broadly in the arrangement of the field circuits with means for controlling them.

There are two main circuits 12 and 13, the circuit 12 comprising in the embodiment shown six poles and the circuit 13 comprising two poles. Obviously, therefore, the main windings provide for the operation of the armature at substantially different speeds. For the main circuit 12 there is provided a starting phase winding 14 and for the main circuit 13 there is provided a starting phase winding 15. The winding 14 has six poles and the winding 15 has two poles, to correspond with the main circuits 12 and 13, respectively.

The relation of the respective phase windings to its main winding is such as to give a satisfactory blocked torque. The phase windings are connected in series and, therefore, have the same phase angles.

By reference to the diagram it will be noted that the lead 16 of the power circuit is in circuit with both main windings and also through the lead 17 with the phase windings, which themselves are connected in series. The lead 18 connects the phase windings with one side of the cutout. The other lead 20 of the power circuit, by means of the three-point switch 3, is adapted to be placed in circuit with one or the other of the leads 21 or 22, the lead 21 being in circuit with the two pole main winding and the lead 22 being in circuit with the six pole main winding. The opposite side of the cutout is in circuit, through the lead 23, with the lead 20 of the power circuit through the switch 3 when the circuit is closed through either of the leads 21 or 22. It will be understood that the switch is a three-point switch, having an open position and a position closing the circuit from the lead 20 selectively with the leads 21 and 22.

It is apparent, therefore, that when the circuit is closed through either main winding the circuit is also closed through the phase windings. This enables the motor to be started for operation selectively, on either one of the main windings, which setting of the switch brings the phase windings in operation for starting purposes.

The cutout is designed to operate at a speed below the break down speed of the slow speed operation of the motor. But in either case, whether the switch is set for operation on the high or low speed, the main winding will bring the motor up to the predetermined speed after the operation thereof has been initiated by the phase circuit.

An advantage of utilizing the phase windings in series is that a single cutout only is necessary for either high or low speed operation of the motor.

Another substantial advantage from the construction of the motor is that the phase windings, being in series, the wire of both phase windings is utilized to set up the required resistance so that larger wire may be used in the windings, thus greatly reducing the heating effect of a given current through the winding.

From the foregoing it will be understood that the construction of the motor herein described provides a single point of control for a two speed motor which may be very compactly constructed and which will be effective in operation.

What I claim and desire to secure by Letters Patent is:—

1. A motor comprising a rotor, a stator having phase windings of different number of poles connected in series, main windings corresponding in number of poles respectively with said phase windings, and a switch whereby the phase windings are placed in circuit selectively with either main winding.

2. In a motor the combination with an armature, of a field winding comprising a plurality of main operating circuits for developing different speeds of the armature, phase windings corresponding respectively with said main windings, said phase windings being connected in series, and a switch control for simultaneously closing the circuit through selected ones of said main windings and through the phase windings.

3. In a motor the combination with an armature, of a field winding comprising a plurality of main operating circuits for developing different speeds of the armature, phase windings corresponding respectively with said main windings, said phase windings being connected in series, a switch control for simultaneously closing the circuit through selected ones of said main windings and through the phase windings, and an automatic cutout arranged to cut out the phase windings at a speed of the armature below the break down speed of the slow speed operation of the motor.

4. In a motor, a field winding comprising plural main windings of different number of poles, phase windings corresponding respectively to said main windings, said phase windings being connected in series, and means for selectively energizing the main windings and for placing the phase windings in circuit when a selected one of the main windings is energized.

5. In a motor, the combination of an armature, with a field winding comprising a phase circuit having windings of different number of poles connected in series, main windings corresponding with said phase windings respectively, and a single cutout device for said phase circuit operable to cut out said phase circuit at a speed below the break down speed of the slow speed operation of the motor when any one of the main windings is energized.

JAMES A. RODGERS.